(12) United States Patent  
Cai

(10) Patent No.: US 11,325,045 B2  
(45) Date of Patent: May 10, 2022

(54) METHOD AND APPARATUS FOR ACQUIRING MERGED MAP, STORAGE MEDIUM, PROCESSOR, AND TERMINAL

(71) Applicant: NETEASE (HANGZHOU) NETWORK CO., LTD., Zhejiang (CN)

(72) Inventor: Kunyu Cai, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/652,423

(22) PCT Filed: Jul. 29, 2019

(86) PCT No.: PCT/CN2019/098147  
§ 371 (c)(1),  
(2) Date: Mar. 31, 2020

(87) PCT Pub. No.: WO2020/107920  
PCT Pub. Date: Jun. 4, 2020

(65) Prior Publication Data  
US 2021/0362061 A1 Nov. 25, 2021

(30) Foreign Application Priority Data  
Nov. 29, 2018 (CN) .......................... 201811445339.7

(51) Int. Cl.  
*A63F 13/77* (2014.01)  
*A63F 13/60* (2014.01)

(52) U.S. Cl.  
CPC .............. *A63F 13/77* (2014.09); *A63F 13/60* (2014.09)

(58) Field of Classification Search  
CPC ........... A63F 13/77; A63F 13/60; A63F 13/52  
See application file for complete search history.

(56) References Cited

U.S. PATENT DOCUMENTS

2005/0256721 A1* 11/2005 Liang ...................... G06T 15/04  
704/276  
2012/0307010 A1* 12/2012 Evertt .................. H04N 13/257  
348/46

(Continued)

FOREIGN PATENT DOCUMENTS

| CN | 104268922 A | 1/2015 |
|---|---|---|
| CN | 104574275 A | 4/2015 |

(Continued)

*Primary Examiner* — Jay Trent Liddle  
(74) *Attorney, Agent, or Firm* — Gang Yu

(57) ABSTRACT

A method and apparatus for acquiring a merged map, a storage medium, a processor, and a terminal are provided. The method includes that: a configuration file and a thumbnail are acquired in an off-line state; and maps corresponding to model components contained in each game scene are loaded during game run, and the maps corresponding to the model components contained in each game scene and the thumbnail are merged according to the configuration file to obtain a merged map corresponding to at least one game scene. The present disclosure solves technical problems in the related art that a processing efficiency of a provided map merging scheme used aiming at a game scene is lower and too much storage space is required to be occupied.

11 Claims, 4 Drawing Sheets

(56) References Cited

U.S. PATENT DOCUMENTS

| | | | | |
|---|---|---|---|---|
| 2014/0176552 A1* | 6/2014 | Belmans | ................ | G06T 15/08 |
| | | | | 345/427 |
| 2015/0049107 A1* | 2/2015 | Park | .................... | G06T 15/005 |
| | | | | 345/582 |
| 2015/0379719 A1* | 12/2015 | Evertt | .................. | A63F 13/213 |
| | | | | 345/419 |
| 2018/0225829 A1* | 8/2018 | Evertt | ...................... | G06T 7/50 |
| 2020/0005509 A1* | 1/2020 | Gibb | .................... | G06T 11/206 |
| 2020/0147491 A1* | 5/2020 | Xu | ........................ | G06F 9/445 |
| 2020/0193717 A1* | 6/2020 | Daly | .................... | G06N 3/0454 |

FOREIGN PATENT DOCUMENTS

| | | | |
|---|---|---|---|
| CN | 105635784 | A | 6/2016 |
| CN | 106056658 | A | 10/2016 |
| CN | 106780642 | A | 5/2017 |
| CN | 107103638 | A | 8/2017 |
| CN | 107154016 | A | 9/2017 |
| CN | 107463398 | A | 12/2017 |
| CN | 108537861 | A | 9/2018 |
| CN | 109603155 | A | 4/2019 |
| WO | 2017165538 | A | 9/2017 |

\* cited by examiner

METHOD AND APPARATUS FOR ACQUIRING MERGED MAP, STORAGE MEDIUM, PROCESSOR, AND TERMINAL

TECHNICAL FIELD

The present disclosure relates to the field of computers, and in particular to a method and apparatus for acquiring a merged map, a storage medium, a processor, and a terminal.

BACKGROUND

A game scene usually refers to a set of model components such as environment, vegetation, buildings, and items in a game. Game players need to complete the game experience through multiple interactions in the game scene. Therefore, the game scene is one of the most important elements of the game experience. Texture maps are required for every model component in the game scene.

Non-next generation game scenes typically use a diffuse map and an offline baked illumination map to render the game scene. A texture of each model component is represented by the diffuse map, and a display result of each model component after being illuminated is represented by the illumination map. Therefore, illumination effects of the model components of non-next generation scenes are static, and different illumination results cannot be presented according to physical properties (e.g., metal and non-metal) of the model components.

Next generation game scenes are usually rendered based on physical illumination calculations. The physical effects of the model components after being illuminated are calculated in real time through diffuse maps, normal maps, and mask maps. The mask maps are often used for indicating physical properties such as metal properties and roughness of the model components. The illumination effects of the model components in the next generation game scene are dynamic, which may be changed continuously with changes in view angle, environment and illumination intensity, and different illumination results may be presented according to the different physical properties of the model components, thereby more meeting the illumination presentation in real life.

In view of the fact that the game scene usually contains a large number of model components, such as buildings, a large number of plants and various items, and maps used between various model components may be different, resulting in that the game scene has a certain complexity in map type and map number. Under a mobile-side general graphics rendering pipeline (e.g., OpenGL) in the related art, at least one additional graphics Application Program Interface (API) is called for map switching. First, the at least one additional graphics is called to complete the binding of model component maps. When different model components use different maps and one model component is rendered each time, multiple graphics APIs are called to complete the switching of the model component maps. Furthermore, since the map is part of a rendering state, after the map is changed, a graphics rendering instruction is recalled to inform a Graphics Processing Unit (GPU) that one more model rendering is required. Considering that the map of the game scene is highly complex, it is easy to cause the process of rendering the scene to increase the number of graphics API calls.

In addition, the calling of graphics API instructions consumes a certain Central Processing Unit (CPU) resource. For mobile terminals, CPU usage is a very important performance indicator. Excessive CPU consumption may lead to a series of problems such as frame drop, sticking, excessive power consumption, and heating, which will seriously affect the game experience of mobile terminal users. Therefore, the graphics API calling brought by the game scene rendering process is effectively reduced, and the frame drop, energy consumption and the like of a mobile terminal can be effectively reduced, thereby improving the gaming experience of a mobile terminal user.

As to the above-mentioned problem, no effective solution has been provided yet.

SUMMARY

At least some embodiments of the present disclosure provide a method and apparatus for acquiring a merged map, a storage medium, a processor, and a terminal, so as at least to partially solve technical problems in the related art that a processing efficiency of a map merging scheme provided for a game scene is lower and too much storage space is required to be occupied.

In an embodiment of the present disclosure, a method for acquiring a merged map is provided, which may include the following steps.

A configuration file and a thumbnail are acquired in an off-line state, and the configuration file is used for storing map configuration information obtained by grouping and merging maps corresponding to model components contained in each of at least one game scene to be processed, and the thumbnail is a thumbnail display carrier of a merged map obtained by grouping and merging the maps corresponding to the model components contained in each game scene; and the maps corresponding to the model components contained in each game scene are loaded during game run, and the maps corresponding to the model components contained in each game scene and the thumbnail are merged according to the configuration file to obtain a merged map corresponding to the at least one game scene.

Optionally, the operation that the configuration file and the thumbnail are acquired in the off-line state may include that: model components contained in each game scene are acquired; the model components contained in each game scene are grouped according to texture information of each model component to obtain a model component grouping result; maps corresponding to each group of model components are merged respectively according to the model component grouping result to obtain a merged map corresponding to each group of model components; and map configuration information of the merged map corresponding to each group of model components is acquired respectively, and stored to the configuration file, where the map configuration information at least includes: a storage path of the merged map corresponding to each group of model components, a size of the merged map corresponding to each group of model components, and a storage path and a UV matrix of a map corresponding to each model component contained in the merged map corresponding to each group of model components.

Optionally, the operation that model components contained in each game scene are acquired may include that: the at least one game scene is acquired by scanning a preset resource catalog; and a scene file of each of the at least one game scene is parsed to acquire model components contained in each game scene.

Optionally, the operation that the model components contained in each game scene are grouped according to the texture information of each model component to obtain the model component grouping result may include that: a diffuse map, a normal map and a mask map of each model component are acquired, and the diffuse map is used for describing diffuse color information of each model component, the normal map is used for describing normal information of each model component, and the mask map is used for describing texture information of each model component; and part of the model components not containing transparent channels in the diffuse maps are classified into a first group of model components, part of the model components that contain transparent channels in the diffuse maps and are determined to be self-luminous according to the mask maps are classified into a second group of model components, and part of the model components that contain transparent channels in the diffuse maps and are determined to be not self-luminous according to the mask maps are classified into a third group of model components, and each model component in the first group of model components is a non-transparent model component, each model component in the second group of model components is a self-luminous model component, and each model component in the third group of model components is a semi-transparent model component.

Optionally, the operation that maps corresponding to each group of model components are merged respectively according to the model component grouping result to obtain the merged map corresponding to each group of model components may include that: a diffuse map, a normal map and a mask map of each model component in each group of model components are acquired; and the diffuse maps of all the model components are merged to obtain at least one diffuse merged map, the normal maps of all the model components are merged to obtain at least one normal merged map, and the mask maps of all the model components are merged to obtain at least one mask merged map.

Optionally, the operation that maps corresponding to each group of model components are merged respectively according to the model component grouping result to obtain the merged map corresponding to each group of model components may include that: a diffuse map of each model component in each group of model components is acquired, and the diffuse maps of all the model components are merged to obtain at least one diffuse merged map; a UV region of the diffuse map of each model component is searched for in the current group in the at least one diffuse merged map; a normal merged map and a mask merged map corresponding to each diffuse merged map are created when the diffuse map, the normal map and the mask map of each model component share the same UV texture coordinates; and the normal map of each model component in the current group is scaled, the scaled normal map is copied to a position corresponding to the UV region in the normal merged map, the mask map of each model component in the current group is scaled, and the scaled mask map is copied to a position corresponding to the UV region in the mask merged map.

Optionally, the operation that the maps corresponding to the model components contained in each game scene and the thumbnail are merged according to the configuration file to obtain the merged map corresponding to the at least one game scene may include the following steps. At an acquisition step, map configuration information of a merged map where a map corresponding to a current model component contained in each game scene is located is acquired. At a determination step, it is determined, according to the map configuration information, whether the merged map where the map corresponding to the current model component is located has been loaded to a memory and buffered in the memory, when a determination result is yes, it continues to perform a refreshing step, and when the determination result is no, it proceeds to a processing step. At the refreshing step, UV coordinates of each vertex on the current model component are refreshed by using a UV matrix of the map corresponding to the current model component, and it returns to the acquisition step until all model components contained in each of the at least one game scene are processed completely. At the processing step, an initial merged map is created in the memory according to a preset map format, a first hierarchically refined texture mapping chain matching the initial merged map is created, the initial merged map is converted into the merged map where the map corresponding to the current model component is located according to a map layout manner of the memory, a map format adopted by the map corresponding to the current model component and a thumbnail of the merged map where the map corresponding to the current model component is located, and the refreshing step is continued, and a size of the initial merged map is equal to a size of the merged map where the map corresponding to the current model component is located.

Optionally, the operation that the initial merged map is converted into the merged map where the map corresponding to the current model component is located according to the map layout manner of the memory, the map format adopted by the map corresponding to the current model component and the thumbnail of the merged map where the map corresponding to the current model component is located may include that: the map corresponding to the current model component and the thumbnail of the merged map where the map corresponding to the current model component is located is loaded in the memory; the map corresponding to the current model component is copied to a corresponding UV region in the merged map where the map corresponding to the current model component is located according to the map layout manner of the memory; and a second hierarchically refined texture mapping chain matching the map corresponding to the current model component is copied stepwise according to the map format adopted by the map corresponding to the current model component into a corresponding hierarchy of the first hierarchically refined texture mapping chain, and a third hierarchically refined texture mapping chain matching the thumbnail of the merged map is copied stepwise into remaining hierarchies of the first hierarchically refined texture mapping chain.

In another embodiment of the present disclosure, an apparatus for acquiring a merged map is also provided, which may include:

an acquisition component, configured to acquire a configuration file and a thumbnail in an off-line state, where the configuration file is used for storing map configuration information obtained by grouping and merging maps corresponding to model components contained in each of at least one game scene to be processed, and the thumbnail is a thumbnail display carrier of a merged map obtained by grouping and merging the maps corresponding to the model components contained in each game scene; and a processing component, configured to load the maps corresponding to the model components contained in each game scene during game run, and merge the maps corresponding to the model components contained in each game scene and the thumbnail according to the configuration file to obtain a merged map corresponding to the at least one game scene.

Optionally, the acquisition component may include: a first acquisition element, configured to acquire model components contained in each game scene; a first processing element, configured to group the model components contained in each game scene according to texture information of each model component to obtain a model component grouping result; a second processing element, configured to merge maps corresponding to each group of model components respectively according to the model component grouping result to obtain a merged map corresponding to each group of model components; and a third processing element, configured to acquire map configuration information of the merged map corresponding to each group of model components respectively, and store the map configuration information to the configuration file, and the map configuration information at least includes: a storage path of the merged map corresponding to each group of model components, a size of the merged map corresponding to each group of model components, and a storage path and a UV matrix of a map corresponding to each model component contained in the merged map corresponding to each group of model components.

Optionally, the first acquisition element may include: a first acquisition sub-element, configured to acquire the at least one game scene by scanning a preset resource catalog; and a parsing element, configured to parse a scene file of each of the at least one game scene to acquire the model components contained in each game scene.

Optionally, the first processing element may include: a second acquisition element, configured to acquire a diffuse map, a normal map and a mask map of each model component, where the diffuse map is used for describing diffuse color information of each model component, the normal map is used for describing normal information of each model component, and the mask map is used for describing texture information of each model component; and a grouping sub-element, configured to classify part of the model components not containing transparent channels in the diffuse maps into a first group of model components, classify part of the model components that contain transparent channels in the diffuse maps and are determined to be self-luminous according to mask maps into a second group of model components, and classify part of the model components that contain transparent channels in the diffuse maps and are determined to be not self-luminous according to the mask maps into a third group of model components, where each model component in the first group of model components is a non-transparent model component, each model component in the second group of model components is a self-luminous model component, and each model component in the third group of model components is a semi-transparent model component.

Optionally, the second processing element may include: a third acquisition sub-element, configured to acquire a diffuse map, a normal map and a mask map of each model component in each group of model components; and a first processing sub-element, configured to merge the diffuse maps of all the model components to obtain at least one diffuse merged map, merge the normal maps of all the model components to obtain at least one normal merged map, and merge the mask maps of all the model components to obtain at least one mask merged map.

Optionally, the second processing element may include: a second processing sub-element, configured to acquire a diffuse map of each model component in each group of model components, and merge the diffuse maps of all the model components to obtain at least one diffuse merged map; a searching sub-element, configured to search for a UV region of the diffuse map of each model component in the current group in the at least one diffuse merged map; a creation sub-element, configured to create a normal merged map and a mask merged map corresponding to each diffuse merged map when the diffuse map, the normal map and the mask map of each model component share the same UV texture coordinates; and a third processing sub-element, configured to scale the normal map of each model component in the current group, copying the scaled normal map to a position corresponding to the UV region in the normal merged map, scale the mask map of each model component in the current group, and copy the scaled mask map to a position corresponding to the UV region in the mask merged map.

Optionally, the processing component may include: a second acquisition element, configured to acquire map configuration information of a merged map where a map corresponding to a current model component contained in each game scene is located; a determination element, configured to determine, according to the map configuration information, whether the merged map where the map corresponding to the current model component is located has been loaded to a memory and buffered in the memory, when a determination result is yes, continue to perform a refreshing element, and when a determination result is no, proceed to a fourth processing element; the refreshing element, configured to refresh UV coordinates of each vertex on the current model component by using a UV matrix of the map corresponding to the current model component, and return to the second acquisition element until all model components contained in each of the at least one game scene are processed completely; and the fourth processing element, configured to create an initial merged map in the memory according to a preset map format, create a first hierarchically refined texture mapping chain matching the initial merged map, convert the initial merged map into the merged map where the map corresponding to the current model component is located according to a map layout manner of the memory, a map format adopted by the map corresponding to the current model component and a thumbnail of the merged map where the map corresponding to the current model component is located, and continue the refreshing step, and a size of the initial merged map is equal to a size of the merged map where the map corresponding to the current model component is located.

Optionally, the fourth processing element may include: a loading sub-element, configured to load the map corresponding to the current model component and the thumbnail of the merged map where the map corresponding to the current model component is located in the memory; a fourth processing sub-element, configured to copy the map corresponding to the current model component to a corresponding UV region in the merged map where the map corresponding to the current model component is located according to the map layout manner of the memory; and a fifth processing sub-element, configured to stepwise copy a second hierarchically refined texture mapping chain matching the map corresponding to the current model component according to the map format adopted by the map corresponding to the current model component into a corresponding hierarchy of the first hierarchically refined texture mapping chain, and stepwise copy a third hierarchically refined texture mapping chain matching the thumbnail of the merged map into remaining hierarchies of the first hierarchically refined texture mapping chain.

In another embodiment of the present disclosure, a storage medium is also provided, which includes a stored program. When the stored program is run, a device where the storage medium is located may be controlled to perform the method for acquiring the merged map as mentioned above.

In another embodiment of the present disclosure, a processor is also provided. The processor may be configured to run a program. When the program is run, the method for acquiring the merged map as mentioned above may be performed.

In another embodiment of the present disclosure, a terminal is also provided. The terminal may include at least one processor, a memory, a display device and at least one program. The at least one program may be stored in the memory, and configured to be executed by the at least one processor. The at least one processor may be configured to perform the method for acquiring the merged map as mentioned above.

In at least some embodiments of the present disclosure, the configuration file and the thumbnail are acquired in an off-line state, the configuration file is used for storing map configuration information obtained by grouping and merging maps corresponding to model components contained in each of at least one game scene to be processed, and the thumbnail is the thumbnail display carrier of the merged map obtained by grouping and merging the maps corresponding to the model components contained in each game scene; and the maps corresponding to the model components contained in each game scene are loaded during game run, and the maps corresponding to the model components contained in each game scene and the thumbnail are merged according to the configuration file to obtain the merged map corresponding to the at least one game scene. The purpose of providing a real-time memory dynamic map merging scheme based on loading of the game scene to the diffuse map, the normal map and the mask map of each model component in a next generation game scene and to a single diffuse map of each model component in a non-next generation game scene is achieved, thereby achieving the technical effects that game scene map multiplexing can be effectively utilized to avoid occupying extra storage space and the efficiency improvement brought by map merging can be obtained to the greatest extent. Thus, the technical problems in the related art that the processing efficiency of the map merging scheme provided for the game scene is lower and too much storage space is required to be occupied are solved.

BRIEF DESCRIPTION OF THE DRAWINGS

The accompanying drawings described herein are used for providing a further understanding of the present disclosure, and constitute a part of the present application, and the exemplary embodiments of the present disclosure and the description thereof are used for explaining the present disclosure, but do not constitute improper limitations to the present disclosure. In the drawings.

DETAILED DESCRIPTION

Figure 1:
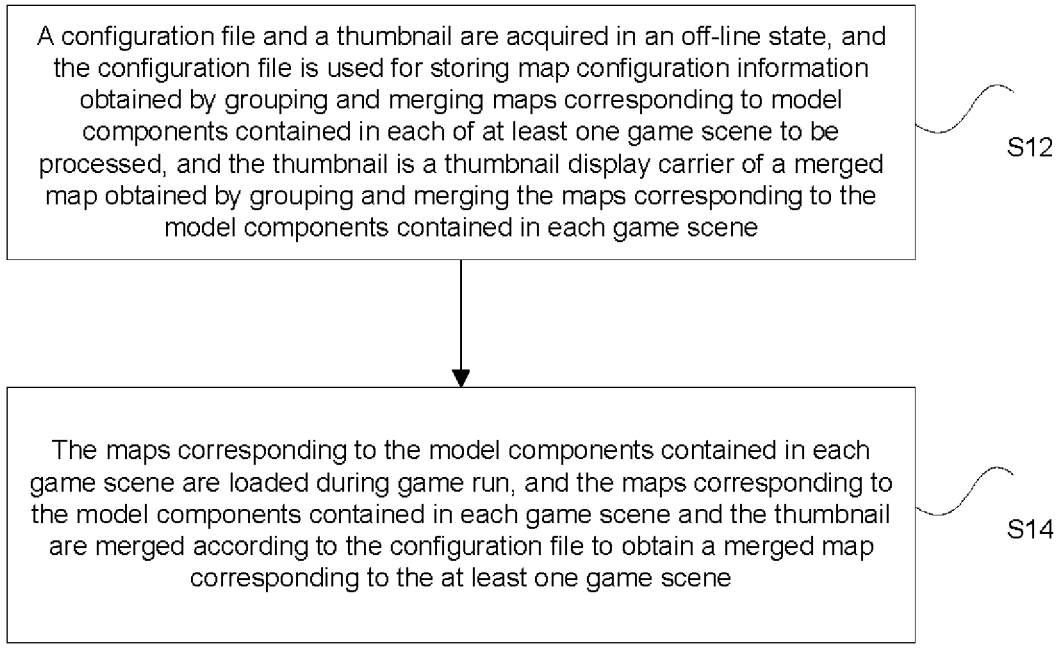
FIG. 1 is a flowchart of a method for acquiring a merged map according to an embodiment of the present disclosure.

In order to make those skilled in the art better understand the solutions of the present disclosure, the technical solutions in the embodiments of the present disclosure will be clearly and completely described below with reference to the drawings in the embodiments of the present disclosure. It is apparent that the described embodiments are a part of the embodiments of the present disclosure, not all of the embodiments. On the basis of the embodiments of the present disclosure, all other embodiments obtained on the premise of no creative work of those of ordinary skill in the art should fall within the scope of protection of the present disclosure.

It is to be noted that the specification and claims of the disclosure and the terms "first", "second" and the like in the drawings are used to distinguish similar objects, and do not need to describe a specific sequence or a precedence order. It will be appreciated that data used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

By merging texture maps of scene model components onto a merged map, the performance consumption of API calls caused by map switching can be reduced to the greatest extent. At present, map merging schemes provided in the related art are mainly divided into the following two categories.

At the first scheme, in an off-line state, maps used by each game scene are queried, and copied to a merged map related to the scene offline, a UV coordinate transformation matrix of each sub-map on the merged map is stored and the sub-map is deleted. Then the merged map is stored to a specified catalog of the game scene. The operation is repeated until merged maps corresponding to all game scenes are stored. In real-time running, when a virtual character controlled by a game player enters a game scene each time, the merged map corresponding to this game scene is loaded.

However, in the first scheme, there are the following technical defects: each game scene needs to store a corresponding merged map, and the merged map also contains a copy of a sub-map. Since there are often shared maps in different game scenes, under this scheme, each map will retain backups in each game scene that uses the map, and when the number of game scenes and the number of the shared maps is large, the scheme will bring immeasurable space occupation.

At the second scheme, all game scenes are retrieved to classify all model components. For example, a particular style of building is divided into a single category. After classifying all model components, the off-line merging process is performed according to the category to store a UV coordinate transformation matrix of each sub-map on the merged map, and then the sub-map is deleted, thereby storing all the merged maps into a common catalog. During the real-time running process, when a virtual character controlled by a game player enters a game scene each time, the merged maps in the common catalog corresponding to all the sub-maps of the game scene are retrieved, and all the merged maps involved are loaded.

However, in the second scheme, there are the following technical defects: the classification of model components is a very complicated process. The classification result will directly determine the number of merged maps used in each game scene, and the efficiency improvement of merging maps in the game scene. Due to the complexity of classification, the second scheme is basically unable to achieve the efficiency improvement brought by the first scheme, and since the retrieved merge map often has some sub-maps not used in the game scene, the scheme also brings a significant increase in the memory footprint of the map.

In an embodiment of the present disclosure, a method for acquiring a merged map is provided. It is to be noted that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

The method embodiment may be implemented in a mobile terminal, a computer terminal or a similar computing device. Running on the mobile terminal is taken as an example. The mobile terminal may include at least one processor (the at least one processor may include but is not limited to a processing device such as a Micro Controller Unit (MCU) or a Field Programmable Gate Array (FPGA)) and a memory for storing data. Optionally, the mobile terminal may further include a transmission device, a display device, and an input/output device for communication functions. Those skilled in the art can understand that the above structural description is illustrative, and does not limit the structure of the above mobile terminal. For example, the mobile terminal may further include more or less components than those described in the above structural description, or have a configuration different from that described above.

The memory may be configured to store a computer program, for example, a software program and component of application software, such as a computer program corresponding to the method for acquiring a merged map in the embodiment of the present disclosure, and the processor executes various functional applications and data processing by running the computer program stored in the memory, that is, implements the above method for acquiring a merged map. The memory may include a high speed random access memory and may also include a non-volatile memory such as at least one magnetic storage device, a flash memory, or other non-volatile solid state memories. In some examples, the memory may further include memories remotely located relative to the processor, which may be connected to the mobile terminal over a network. The examples of such networks include, but are not limited to, the Internet, the Intranet, local area networks, mobile communication networks, and combinations thereof.

The transmission device is configured to receive or send data via a network. The above specific network example may include a wireless network provided by a communication provider of the mobile terminal. In one example, the transmission device includes a Network Interface Controller (NIC) that may be connected to other network devices through a base station to communicate with the Internet. In one example, the transmission device may be a Radio Frequency (RF) component for communicating with the Internet wirelessly.

In the present embodiment, the above method for acquiring a merged map running on the mobile terminal is provided. FIG. 1 is a flowchart of a method for acquiring a merged map according to an embodiment of the present disclosure. As shown in FIG. 1, the method includes the following steps.

At step S12, a configuration file and a thumbnail are acquired in an off-line state, and the configuration file is used for storing map configuration information obtained by grouping and merging maps corresponding to model components contained in each of at least one game scene to be processed, and the thumbnail is a thumbnail display carrier of a merged map obtained by grouping and merging the maps corresponding to the model components contained in each game scene.

At step S14, the maps corresponding to the model components contained in each game scene are loaded during game run, and the maps corresponding to the model components contained in each game scene and the thumbnail are merged according to the configuration file to obtain a merged map corresponding to the at least one game scene.

By means of the above steps, the configuration file and the thumbnail are acquired in the off-line state, and the configuration file is used for storing map configuration information obtained by grouping and merging maps corresponding to model components contained in each of at least one game scene to be processed, and the thumbnail is the thumbnail display carrier of the merged map obtained by grouping and merging the maps corresponding to the model components contained in each game scene; and the maps corresponding to the model components contained in each game scene are loaded during game run, and the maps corresponding to the model components contained in each game scene and the thumbnail are merged according to the configuration file to obtain the merged map corresponding to the at least one game scene. The purpose of providing a real-time memory dynamic map merging scheme based on loading of the game scene to the diffuse map, the normal map and the mask map of each model component in a next generation game scene and to a single diffuse map of each model component in a non-next generation game scene is achieved, thereby achieving the technical effects that game scene map multiplexing can be effectively utilized to avoid occupying extra storage space and the efficiency improvement brought by map merging can be obtained to the greatest extent. Thus, the technical problems in the related art that the processing efficiency of the map merging scheme provided for the game scene is lower and too much storage space is required to be occupied are solved.

Optionally, at step S12, the operation that the configuration file is acquired in the off-line state may include the following execution steps.

At step S121, model components contained in each game scene are acquired.

At step S122, the model components contained in each game scene are grouped according to texture information of each model component to obtain a model component grouping result.

At step S123, maps corresponding to each group of model components are merged respectively according to the model component grouping result to obtain a merged map corresponding to each group of model components.

At step S124, map configuration information of the merged map corresponding to each group of model components is acquired respectively, and the map configuration information is stored to the configuration file, and the map configuration information at least includes: a storage path of the merged map corresponding to each group of model components, a size of the merged map corresponding to each group of model components, and a storage path and a UV matrix of a map corresponding to each model component contained in the merged map corresponding to each group of model components.

The main purpose of merging scene maps is to reduce the extra rendering instruction calls due to map switching and rendering state switching. In order to maximize the benefits of map merging, it is first necessary to analyze the common rendering state switching operations of the model components in the game scene. There are usually several types of rendering state switching in the game scene.

At one, a switch between a non-transparent model rendering state and a semi-transparent model rendering state. For example, a building is a non-transparent model and a leaf is a semi-transparent model.

At two, rendering state switching due to material differences, for example, materials of self-luminous model components (e.g., lanterns, lights, and windows at night) are different from materials of non-self-luminous model components.

In an optional embodiment of the present disclosure, the model components in each game scene are divided into three groups of model components according to three rendering states of the model components, namely a non-transparent model component, a semi-transparent model component and a self-luminous model component. By setting some memory copy operations related to the running state to be processed during game play, and setting other time-consuming parameter calculation processes that are independent of the running state to be processed offline, the storage space consumption brought by map merging during the game running period can be effectively reduced, and the merging efficiency can be improved. That is, the main purpose of the offline processing is to acquire the maps corresponding to the model components contained in each game scene in an off-line state, group and merge the maps, and obtain final map configuration information. Thus, by grouping and merging the maps for the game scenes one by one, it is possible to maximally ensure that the texture maps of the model components in the same rendering state in the same game scene are on the same merged map, thereby minimizing to call at least one graphics rendering instruction caused by map switching. In addition, by grouping and merging the maps for the game scenes one by one, it is necessary to load the maps used by the game scene, thereby avoiding the memory occupation problem caused by loading the extra maps.

It is to be noted that the above optional embodiment mainly describes a map merging process of a next generation game scene model component, which includes a combination of a diffuse map, a normal map and a mask map. For non-next generation game scenes that contain diffuse maps, the same method may be used for completing map merging. The model component material group described in the above optional embodiment includes a non-transparent group, a semi-transparent group and a self-luminous group, and the similar mapping mode may be used for completing the map merging process for other grouping forms.

Optionally, at step S121, the operation that the model components contained in each game scene are acquired may include the following execution steps.

At step S1211, the at least one game scene is acquired by scanning a preset resource catalog.

At step S1212, a scene file of each of the at least one game scene is parsed to acquire the model components contained in each game scene.

The above game scene may be a single specified game scene, or may be a list of multiple scenes to be processed input through a list form. Therefore, by scanning a specified resource catalog, all scene lists to be processed in the game may be acquired, and then the scene files of each game scene in the scene list to be processed are parsed to acquire all model components contained in each game scene.

Optionally, at step S122, the operation that the model components contained in each game scene are grouped according to the texture information of each model component to obtain the model component grouping result may include the following execution steps.

At step S1221, a diffuse map, a normal map and a mask map of each model component are acquired, where the diffuse map is used for describing diffuse color information of each model component, the normal map is used for describing normal information of each model component, and the mask map is used for describing texture information of each model component.

At step S1222, part of the model components not containing transparent channels in the diffuse maps are classified into a first group of model components, part of the model components that contain transparent channels in the diffuse maps and are determined to be self-luminous according to mask maps are classified into a second group of model components, and part of the model components that contain transparent channels in the diffuse maps and are determined to be not self-luminous according to the mask maps are classified into a third group of model components, and each model component in the first group of model components is a non-transparent model component, each model component in the second group of model components is a self-luminous model component, and each model component in the third group of model components is a semi-transparent model component.

For the model components of a next generation game scene, three kinds of maps namely a diffuse map, a normal map and a mask map are mainly used for completing the next generation effect. The diffuse map is used for describing diffuse color information of a model. The normal map is used for describing normal information of the model. The mask map is used for describing material information of the model, which usually includes information such as metallicity, roughness, and environmental masking. In addition, for the model components of the next generation game scene, a diffuse map has one corresponding normal map and one corresponding mask map, so the same UV texture coordinates may be used for avoiding the memory footprint caused by multiple UV texture coordinates.

In the grouping process of model components, since it is necessary to divide the model components into three groups: non-transparent, semi-transparent and self-luminous, a model component that does not contain a transparent channel in a diffuse map may be directly determined as a non-transparent model component, and the model component is divided into the group where the non-transparent model component is located. For a model component that contains a transparent channel in a diffuse map, since the transparent channel may also be used as a self-luminous intensity channel, it is necessary to distinguish whether the model component is a self-luminous model component by material information. If the model component is not the self-luminous model component, the model component is divided into the group where the transparent model component is located. If the model component is the self-luminous model component, the model component is divided into the group where the self-luminous model component is located. After the model component category is divided, the other model components of the game scene are traversed until all the model components in the game scene are completely divided.

Optionally, at step S123, the operation that maps corresponding to each group of model components are merged respectively according to the model component grouping result to obtain the merged map corresponding to each group of model components may include the following execution steps.

At step S1231, a diffuse map, a normal map and a mask map of each model component in each group of model components are acquired.

At step S1232, the diffuse maps of all the model components are merged to obtain at least one diffuse merged map, the normal maps of all the model components are merged to obtain at least one normal merged map, and the mask maps of all the model components are merged to obtain at least one mask merged map.

The group where the non-transparent model component is located is taken as an example, the diffuse map, the normal map and the mask map of the model component is respectively merged to obtain a merged map result. That is, all the diffuse maps are merged into at least one diffuse merged map, all the normal maps are merged into at least one normal merged map, and all the mask maps are merged into at least one mask merged map. For the group where the non-transparent model component is located, the merging result is at least one diffuse merged map, at least one normal merged map, and at least one mask merged map. And each diffuse merged map corresponds to one normal merged map and one mask merged map. Due to size limitation of maps, for example, the mobile terminal usually reads a merged map with a maximum size of 4096×4096, if the number of sub-maps is too large or the size is too large, the merged map with a maximum size of 4096×4096 cannot complete all merging operations. Therefore, another merged map with a maximum size of 4096×4096 is required, and so on, until all sub-maps are merged into the above merged map.

Optionally, at step S123, the operation that maps corresponding to each group of model components are merged respectively according to the model component grouping result to obtain the merged map corresponding to each group of model components may include the following execution steps.

At step S1233, a diffuse map of each model component in each group of model components is acquired, and the diffuse maps of all the model components are merged to obtain at least one diffuse merged map.

At step S1234, a UV region of the diffuse map of each model component is searched for in a current group in the at least one diffuse merged map.

At step S1235, a normal merged map and a mask merged map corresponding to each diffuse merged map are created when the diffuse map, the normal map and the mask map of each model component share the same UV texture coordinates.

At step S1236, the normal map of each model component in the current group is scaled, the scaled normal map is copied to a position corresponding to the UV region in the normal merged map, the mask map of each model component in the current group is scaled, and the scaled mask map is copied to a position corresponding to the UV region in the mask merged map.

After obtaining the diffuse maps of all the model components, several merged diffuse merged map results may be obtained by running the existing map merging algorithm. Considering that the normal map, the mask map and the diffuse map share of the same UV texture coordinates and achieve one-to-one correspondence, the corresponding normal merged map and mask merged map may be directly generated by the result of the diffuse merged map.

Specifically, firstly, a model component is selected, and a diffuse map D of the model component, a corresponding normal map N and mask map M are acquired. Secondly, a corresponding UV region RectA of the diffuse map D in a diffuse merged map A is found in a merging result of diffuse maps. Then, for the diffuse merged map A, if a corresponding normal merged map has not existed yet, it is necessary to create a normal merged map B, RectA is used as a UV region of the normal map N, a scaling operation is performed on the normal map N to make this normal map N match a resolution of the region RectA in the normal merged map B, and the scaled normal map N is then copied to the corresponding region RectA in the normal merged map B. Similarly, the corresponding mask merged map may also be obtained in the same way.

The above optional implementation manner will be further described in detail below in conjunction with the optional implementation process illustrated in FIG. 2.

Figure 2:
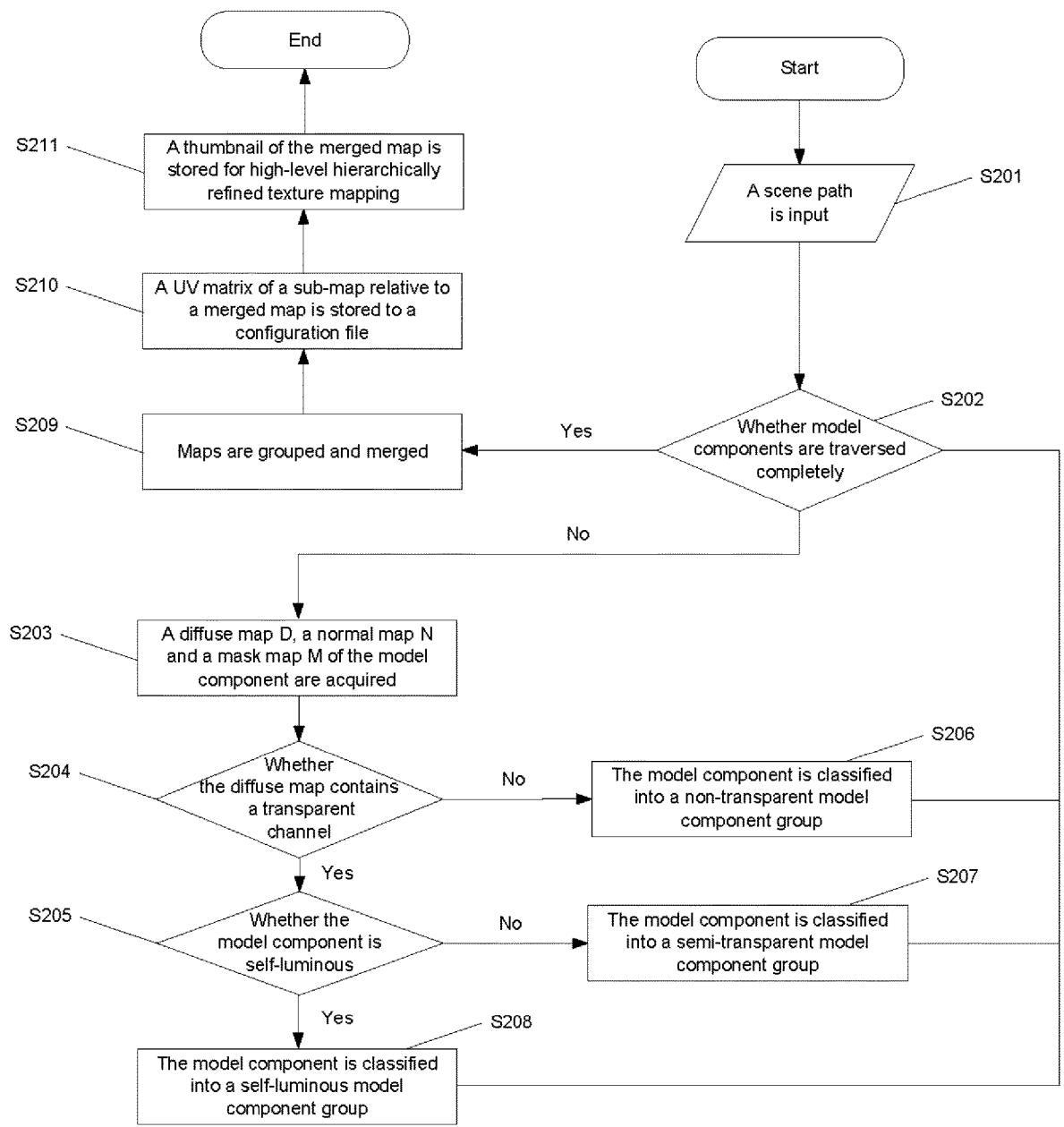
FIG. 2 is a flowchart of a merged map off-line processing process according to an optional embodiment of the present disclosure.

FIG. 2 is a flowchart of a merged map off-line processing process according to an optional embodiment of the present disclosure. As shown in FIG. 2, an input parameter is a specified scene path parameter, and an output is a map merging result of the specified scene, which includes a path and size of the merged map corresponding to each group of model components, a sub-map path corresponding to the model component contained in each merged map, and a UV matrix of each sub-map on the merged map. The method may include the following processing steps.

At step S201, a game scene path is input, the path being an absolute path. The game scene may be a single specified game scene, or may be a list of multiple scenes to be processed input through a list form. Therefore, by scanning a specified resource catalog, all scene lists to be processed in the game may be acquired.

At step S202, each game scene usually includes multiple model components, a scene file of each game scene in all the scene lists to be processed is parsed to acquire all model components contained in each game scene. Optionally, for each model component, a corresponding material-related file of the model component is loaded.

At step S203, for the model components of a next generation game scene, three kinds of maps namely a diffuse map, a normal map and a mask map are mainly used for completing the next generation effect. The diffuse map is used for describing diffuse color information of a model. The normal map is used for describing normal information of the model. The mask map is used for describing material information of the model, which usually includes information such as metallicity, roughness, and environmental masking. In addition, for the model components of the next generation game scene, a diffuse map has one corresponding normal map and one corresponding mask map, so the same UV texture coordinates may be used for avoiding the memory occupied by multiple sets of UV texture coordinates.

At step S204 to step S208, in the grouping process of model components, since it is necessary to divide the model components into three groups, namely a non-transparent group, a semi-transparent group and a self-luminous group, a model component that does not contain a transparent channel in a diffuse map may be directly determined as a non-transparent model component, and the model component is divided into the group where the non-transparent model component is located. For a model component that contains a transparent channel in a diffuse map, since the transparent channel may also be used as a self-luminous intensity channel, it is necessary to distinguish whether the model component is a self-luminous model component by material information. If the model component is not the self-luminous model component, the model component is divided into the group where the transparent model component is located. If the model component is the self-luminous model component, the model component is divided into the group where the self-luminous model component is located. After the model component category is divided, the other model components of the game scene are traversed until all the model components in the game scene are completely divided.

At step S209, after grouping the model components in the game scene, a grouping and map-merging operation is started.

The group where the non-transparent model component is located is taken as an example, the diffuse map, the normal map and the mask map of the model component need to be respectively merged to obtain a merged map result. That is, all the diffuse maps are merged into at least one diffuse merged map, all the normal maps are merged into at least one normal merged map, and all the mask maps are merged into at least one mask merged map. For the group where the non-transparent model component is located, the merging result is at least one diffuse merged map, at least one normal merged map, and at least one mask merged map, and each diffuse merged map corresponds to one normal merged map and one mask merged map.

In addition, in an optional implementation manner, after obtaining the diffuse maps of all the model components, several merged diffuse merged map results may be obtained by running the existing map merging algorithm. Considering that the normal map, the mask map and the diffuse map share of the same UV texture coordinates and achieve one-to-one correspondence, the corresponding normal merged map and mask merged map may be directly generated by the result of the diffuse merged map.

Specifically, firstly, a model component is selected, and a diffuse map D of the model component, a corresponding normal map N and mask map M are acquired. Secondly, a corresponding UV region RectA of the diffuse map D in a diffuse merged map A is found in a merging result of diffuse maps. Then, for the diffuse merged map A, if a corresponding normal merged map has not existed yet, it is necessary to create a normal merged map B, and RectA is used as a UV region of the normal map N. After that, a scaling operation is performed on the normal map N to make the normal map N match the resolution of the region RectA in the normal merged map B, and the scaled normal map N is then copied to the corresponding region RectA in the normal merged map B. Similarly, the corresponding mask merged map may also be obtained in the same way.

At step S210, after the execution of the map merging operation is completed, a UV offset and a UV scaling value of each sub-map in the merged map are selected to determine a UV matrix of the sub-map. Then, a storage path of each merged map, the size of the merged map, a path of each sub-map contained in the merged map and a UV matrix are stored into a configuration file namely atlas.config.

At step S211, a small image of the merged map is stored as a thumbnail.

Through the above optional implementation manner, the model components and map multiplexing of different game scenes are effectively utilized, and it is not necessary to store the merged map, but a small thumbnail corresponding to the merged map, thereby reducing the storage space occupation caused by map merging, and reducing the overall package size of the game.

Optionally, at step S14, the operation that the maps corresponding to the model components contained in each game scene and the thumbnail are merged according to the configuration file to obtain the merged map corresponding to the at least one game scene may include the following execution steps.

At step S141, map configuration information of a merged map where a map corresponding to a current model component contained in each game scene is located is acquired.

At step S142, it is determined, according to the map configuration information, whether the merged map where the map corresponding to the current model component is located has been loaded to a memory and buffered in the memory, when a determination result is yes, it continues to perform step S143, and when the determination result no, the flow proceeds to step S144.

At step S143, UV coordinates of each vertex on the current model component are refreshed by using a UV matrix of the map corresponding to the current model component, and the flow returns to step S141 until all model components contained in each of the at least one game scene are processed completely.

At step S144, an initial merged map is created in the memory according to a preset map format, a first hierarchically refined texture mapping chain matching the initial merged map is created, the initial merged map is converted into the merged map where the map corresponding to the current model component is located according to a map layout manner of the memory, a map format adopted by the map corresponding to the current model component and a thumbnail of the merged map where the map corresponding to the current model component is located, and step S143 is continued, and a size of the initial merged map is equal to a size of the merged map where the map corresponding to the current model component is located.

In the game development process, hierarchical mipmap of maps is a common performance optimization way. Each map requires a complete mipmap chain. For a common merged map having a resolution of 4096×4096, the mipmap chain includes 13 levels. For a common minimum game scene map having a resolution of 64×64, the mipmap chain includes 7 levels.

It is considered that a map A having a resolution of 64×64 is stepwise copied to a merged map B having a size of 4096×4096 according to the mipmap. That is, a level-0 mipmap of the map A is copied to a corresponding UV position on a level-0 mipmap of the map B, a level-1 mipmap of the map A is copied to a corresponding UV position on a level-1 mipmap of the map B, and so on, until all levels of the map A are copied. Since the highest mipmap level of the map A is 6, the level 7-12 mipmap of the map B lacks related information about the map A, which may obtain an undefined result during running if the model component is sampled to a region of the level 7-12 mipmap of the map B. Further, since the compression format common to mobile terminals is a block-based smallest compression element, for example, ASTC, ETC2 and ETC1 are all compressed in blocks of 4×4 texels. Copying is performed in block elements during map copying. For the map A, a 4×4 mipmap level, that is, level-4 mipmap, is copied at most, and the corresponding map B will be in an undefined state from a UV region of level 5-12 mipmap. To ensure that a complete mipmap chain of the merged map, the mipmap chain of level 5 and above level 5 of the merged map is stored as a thumbnail. Therefore, for the map B, it is necessary to store a thumbnail having a resolution of 128×128 with mipmap level, which takes up 1/1024 of the space of the original image. The atlas.config configuration information stored in the off-line process and the thumbnail of the merged map will be used as input parameters of the merged map during running.

When the game starts running, the atlas.config configuration information is read to obtain a merged map configuration list corresponding to each game scene. After entering the game, the game scene starts to be loaded, and the game scene will load the model components contained in the game scene one by one. In the process of loading the model components, for each model component, a diffuse map D, a normal map N and a mask map M of the model component are acquired. When it is determined that the diffuse map D, the normal map N and the mask map M exist in a configuration list of the merged map of the game scene, that is, the diffuse map D, the normal map N and the mask map M are involved in map merging, merged maps DA, NA and MA where the diffuse map D, the normal map N and the mask map M are located are acquired, and the size of the merged map, a path of the merged map and UV matrix of the sub-map contained in the merged map and a path of a thumbnail are obtained from the configuration information. Then, if it is determined that the merged map has been loaded into the memory and buffered, the UV matrix of the sub-map is used for traversing each vertex of the model component and refresh the UV coordinates of each vertex of the model component. If it is determined that the merged map has not been loaded into the memory, the sub-map list of the merged map is read, the sub-maps are loaded sequentially and copied to the corresponding UV region according to the memory layout of the map, and the thumbnail of the merged map is loaded and copied to the corresponding mipmap level of the merged map.

Optionally, at step S144, the operation that the initial merged map is converted into the merged map where the map corresponding to the current model component is located according to the map layout manner of the memory, the map format adopted by the map corresponding to the current model component and the thumbnail of the merged map where the map corresponding to the current model component is located may include the following execution steps.

At step S1441, the map corresponding to the current model component and the thumbnail of the merged map where the map corresponding to the current model component is located are loaded in the memory.

At step S1442, the map corresponding to the current model component is copied to a corresponding UV region in the merged map where the map corresponding to the current model component is located according to the map layout manner of the memory.

At step S1443, a second hierarchically refined texture mapping chain matching the map corresponding to the current model component is stepwise copied according to the map format adopted by the map corresponding to the current model component into a corresponding hierarchy of the first hierarchically refined texture mapping chain, and a third hierarchically refined texture mapping chain matching the thumbnail of the merged map is stepwise copied into remaining hierarchies of the first hierarchically refined texture mapping chain.

Assuming that the resolution of the thumbnail is 128×128, the mipmap level (i.e., the third hierarchically refined texture mapping chain) of the thumbnail is level-0 128×128, level-1 64×64, level-2 32×32, and so on, until the mipmap level is 1×1. Assuming that the resolution of the merged map is 2048×2048, and the mipmap level of the merged map (i.e., the first hierarchically refined texture mapping chain) is level-0 2048×2048, level-1 1024×1024, level-2 512×512, level-3 256×256, level-4 128×128, it can be known that the mipmap level of the merged map at level 4 and above level 4 may be directly replaced with a thumbnail map. The mipmap level of the merged map below level 4 may be implemented by using the second hierarchically refined texture mapping chain matching the map corresponding to the current model component in a stepwise copying manner.

The above optional implementation manner will be further described in detail below in conjunction with the optional implementation process illustrated in FIG. 3.

Figure 3:
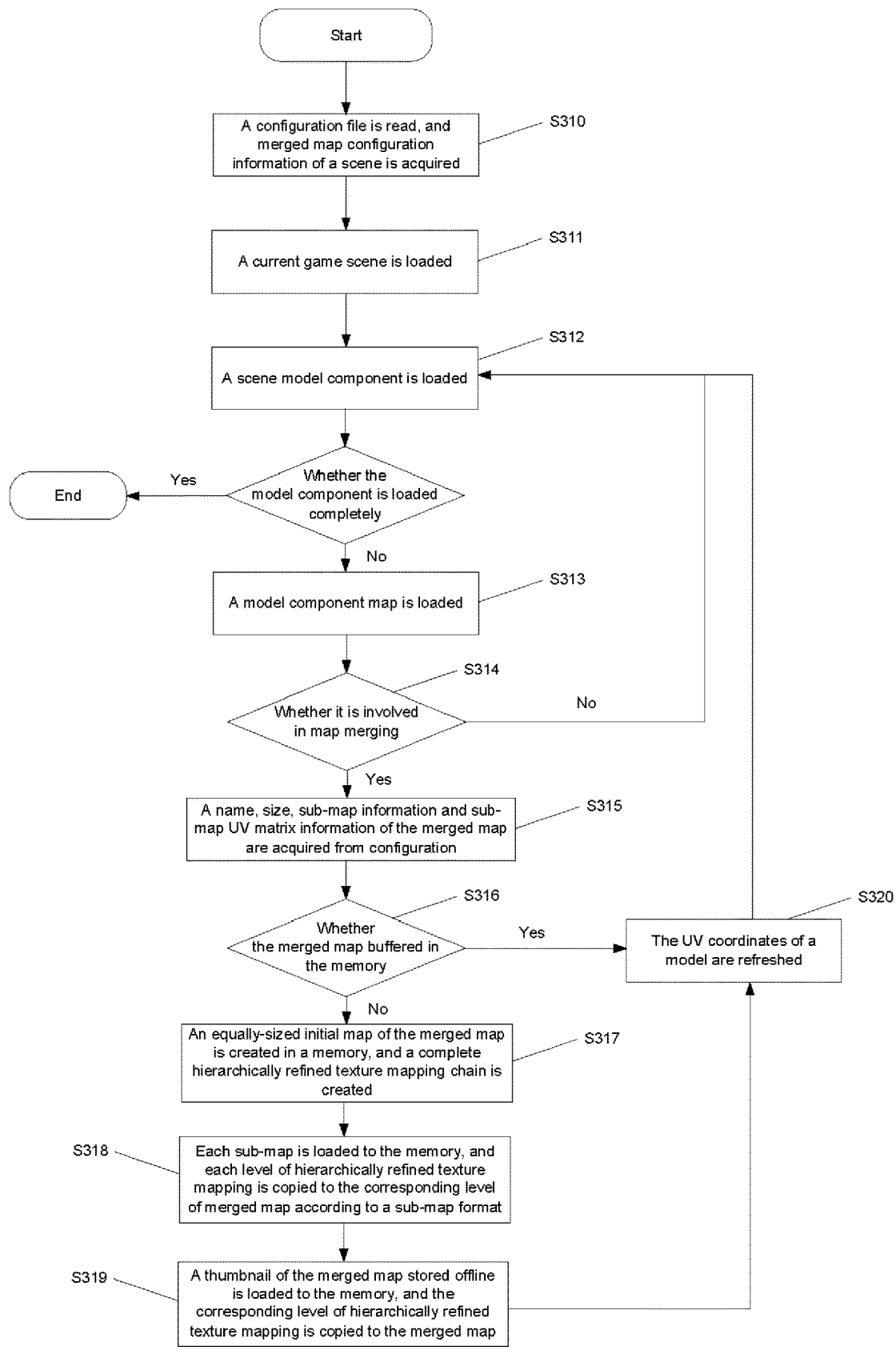
FIG. 3 is a flowchart of a merged map execution process during game run according to an optional embodiment of the present disclosure.

FIG. 3 is a flowchart of a merged map execution process during the game run according to an optional embodiment of the present disclosure. As shown in FIG. 3, the flow may include the following execution steps.

At step S310, when the game starts running, the atlas.config configuration information is read to obtain a merged map configuration list corresponding to each game scene.

At steps S311 to S312, after entering the game, the game scene starts to be loaded, and the game scene will load the model components contained in the game scene one by one.

At step S313, in the process of loading the model components, for each model component, a diffuse map D, a normal map N and a mask map M of the model component are acquired.

At step S314, it is determined whether the diffuse map D, the normal map N and the mask map M exist in a configuration list of the merged map of the game scene, and when the determination result is yes, it is determined that the diffuse map D, the normal map N and the mask map M are involved in map merging.

At step S315, merged maps DA, NA and MA where the diffuse map D, the normal map N and the mask map M are located are acquired, and the size of the merged map, a path of the merged map and UV matrix of the sub-map contained in the merged map and a path of a thumbnail are obtained from the configuration information.

At step S316, it is determined whether the merged map has been loaded into the memory and buffered, when the determination result is yes, the UV matrix of the sub-map is used for traversing each vertex of the model component and refresh the UV coordinates of each vertex of the model component through step S320, the refreshing formula being as follows:

$$(U_{out}, V_{out}) = (U, V) * (Scale_u, Scale_v) + (Offset_u, Offset_v)$$

The input UV value is set by an artist, $(Scale_u, Scale_u)$ and $(Offset_u, Offset_v)$ are the UV matrix values obtained by map merging, and the output $(U_{out}, V_{out})$ is new vertex UV coordinates.

At step S317, for a merged map that is not created, the map merging process is started. First, an internal map format used by a platform is determined. The PC side is ARGB8888 or RGB888, and the mobile side includes multiple compression formats such as ASC, ETC2, ETC1, and PVRTC. In order to ensure the compatibility and correctness of the merged map on the mobile side, the size of the merged map is required to be n power of two, referred to as a pot map. The size of each sub-map is also n power of two. Then, a merged map A with a specified internal format and a specified size in the memory, a complete mipmap chain of the merged map A is created, and each level of mipmap memory is filled with a default color value.

At step S318, a sub-map list of the merged map is read, and the sub-maps are sequentially loaded, and copied to the corresponding UV region according to the memory layout of the map (pixel or block arrangement in the memory is different, and the copy operation is completed according to the difference of the memory arrangement in the copying process to obtain a correct processing result).

A diffuse sub-map D having a resolution of 256×256 is taken as an example. According to different map formats, memory copying methods are as follows.

Method one, ARGB888 or RGB88: The sub-maps are copied line by line to the corresponding region of the merged map. For the map D, one line, that is, 256 pixels may be copied each time, and a total of 256 copy operations are performed.

Method two ETC1: It is a block-compressed format. It does not contain a transparent channel. The fixed size of the block is 4×4. For this purpose, the sub-map is copied line by line to the merged map according to the 4×4 block. For the map D, a row of 64 blocks has a total of 512 bytes, and each time a block is copied, a total of 64 copy operations are performed.

Method three ETC2: It is a block-compressed format, the fixed size of the block is 4×4, and the method for merging the ETC2 map that does not contain the transparent channel is the same as ETC1. In the ETC2 map that contains the transparent channel, each block size is 128 bit. For the map D, a row of 64 blocks has a total of 1024 bytes, and each time a block is copied, a total of 64 copy operations are performed.

Method four, ASTC: It is a block-compressed format. To facilitate copying, it is necessary to unify the block size of all sub-maps during compression. Considering the boundary of copying at least one block by the pot map, the block size is set to 4×4 or 8×8. Game scene maps are typically compressed using an 8×8 block. In the process of map merging, the sub-map is copied to the corresponding region of the merged map line by line according to the block size of 8×8. For the map D, a row of 32 blocks has a total of 512 bytes, and each time a block is copied, a total of 32 copy operations are performed.

Method five, PVRTC: It is stored in Morton-order. The game scene is usually compressed in a 2 bpp format. In the case of ensuring that both the merged map and the sub-map are pot, the sub-map is copied for one time. For the map D, the copy operation is performed once for a total of 16384 bytes.

Therefore, the memory copy based on a map format during running may effectively utilize the compression format (for example, PVRTC, ETC1, ETC2, and ASTC) of the mobile terminal to perform a block-by-block copy operation to improve the merging efficiency.

At step S319, the thumbnail of the merged map is loaded, and copied to the corresponding mipmap level of the merged map.

At step S320, the vertices of the model component are traversed, and the UV coordinates of each vertex of the model component are refreshed.

In summary, the sub-map related parameters and thumbnails for the merged map are first acquired by off-line processing, then the sub-maps are loaded while the game is running, and the sub-maps and the thumbnails are copied in the memory to the corresponding levels of the merged map and the corresponding positions to achieve dynamic merging of game scene maps.

By adopting each of the above optional embodiments, the following performance optimizations can be brought about in the map merging process:

The DrawCall is a more intuitive statistical manner to express the rendering call. Table 1 is used for presenting change in the number of DrawCall of a game scene brought about by using a merged map.

TABLE 1

| Number | Non-merged map DrawCall | Merged map DrawCall | Optimal percent |
| --- | --- | --- | --- |
| 1 | 35 | 18 | 31.5% |
| 2 | 46 | 27 | 41.3% |
| 3 | 36 | 22 | 38.9% |
| 4 | 39 | 24 | 38.5% |

This table counts the DrawCall caused by the change of the rendering state in some game scenes, and does not consider the DrawCall caused by the discontinuity of the buffer.

Table 2 is a comparison of an off-line map merging manner and an off-line processing and runtime map merging manner according to an optional implementation manner of the present disclosure. The comparison is mainly reflected in the comparison of the various compression formats used by the mobile terminal in the storage space occupation. Table 2 shows the total usage of diffuse maps for 30 game scenes.

TABLE 2

| Format | Off-line merging block (MB) | Off-line processing + runtime merging block (MB) | Optimal percent |
| --- | --- | --- | --- |
| ETC1 | 374 | 132 | 63.02% |
| ETC2_RGBA | 748 | 265 | 64.5% |
| PVRTC_2bpp | 187 | 66 | 64.7% |
| ASTC_8x8 | 187 | 66 | 64.7% |

Table 3 is used for calculating the CPU time period occupation of runtime map merging of different devices in different formats. The game scene used in the test case merges a 4096×4096 non-transparent diffuse map, a 2048×2048 semi-transparent diffuse map, and a 1024×1024 self-luminous diffuse map.

TABLE 3

| Device | Map format | CPU time period (ms) |
| --- | --- | --- |
| IPhone6 | PVRTC | 181 |
| Xiaomi 5s | ETC1 | 376 |
| Huawei Honor 6 | ETC1 | 844 |

In summary, through off-line processing and runtime map merging, in the case of occupying a small additional storage space, the map merging operation can be efficiently performed in the memory, and the call of an image API brought by the game scene rendering can be effectively reduced, thereby reducing CPU usage.

Through the description of the above implementation modes, those skilled in the art can clearly understand that the method according to the above embodiment may be implemented by means of software plus a necessary general hardware platform, and of course, may also be implemented through hardware, but in many cases, the former is a better implementation manner. Based on such understanding, the technical solution of the present disclosure, which is essential or contributes to the conventional art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure.

In the present embodiment, an apparatus for acquiring a merged map is also provided, which is configured to implement the above embodiments and preferred implementation manners, and the description thereof has been omitted. As used below, the term "component" may implement a combination of software and/or hardware of a predetermined function. Although the apparatus described in the following embodiments is preferably implemented by software, hardware or a combination of software and hardware is also possible and conceived.

Figure 4:
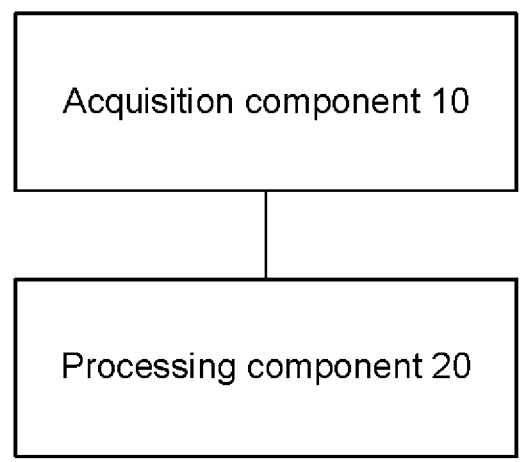
FIG. 4 is a structural block diagram of an apparatus for acquiring a merged map according to an embodiment of the present disclosure.

FIG. 4 is a structural block diagram of an apparatus for acquiring a merged map according to an embodiment of the present disclosure. As shown in FIG. 4, the apparatus includes: an acquisition component 10, configured to acquire a configuration file and a thumbnail in an off-line state, where the configuration file is used for storing map configuration information obtained by grouping and merging maps corresponding to model components contained in each of at least one game scene to be processed, and the thumbnail is a thumbnail display carrier of a merged map obtained by grouping and merging the maps corresponding to the model components contained in each game scene; and a processing component 20, configured to load the maps corresponding to the model components contained in each game scene during game run, and merge the maps corresponding to the model components contained in each game scene and the thumbnail according to the configuration file to obtain a merged map corresponding to the at least one game scene.

Optionally, the acquisition component 10 includes: a first acquisition element (not shown in the figure), configured to acquire model components contained in each game scene; a first processing element (not shown in the figure), configured to group the model components contained in each game scene according to texture information of each model component to obtain a model component grouping result; a second processing element (not shown in the figure), configured to merge maps corresponding to each group of model components respectively according to the model component grouping result to obtain a merged map corresponding to each group of model components; and a third processing element (not shown in the figure), configured to acquire map configuration information of the merged map corresponding to each group of model components respectively, and store the map configuration information to the configuration file, and the map configuration information at least includes: a storage path of the merged map corresponding to each group of model components, a size of the merged map corresponding to each group of model components, and a storage path and a UV matrix of a map corresponding to each model component contained in the merged map corresponding to each group of model components.

Optionally, the first acquisition element (not shown in the figure) includes: a first acquisition sub-element (not shown in the figure), configured to acquire the at least one game scene by scanning a preset resource catalog; and a parsing element (not shown in the figure), configured to parse a scene file of each of the at least one game scene to acquire the model components contained in each game scene.

Optionally, the first processing element (not shown in the figure) includes: a second acquisition element (not shown in the figure), configured to acquire a diffuse map, a normal map and a mask map of each model component, where the diffuse map is used for describing diffuse color information of each model component, the normal map is used for describing normal information of each model component, and the mask map is used for describing texture information of each model component; and a grouping sub-element (not shown in the figure), configured to classify part of the model components not containing transparent channels in the diffuse maps into a first group of model components, classify part of the model components that contain transparent channels in the diffuse maps and are determined to be self-luminous according to mask maps into a second group of model components, and classify part of the model components that contain transparent channels in the diffuse maps and are determined to be not self-luminous according to the mask maps into a third group of model components, where each model component in the first group of model components is a non-transparent model component, each model component in the second group of model components is a self-luminous model component, and each model component in the third group of model components is a semi-transparent model component.

Optionally, the second processing element (not shown in the figure) includes: a third acquisition sub-element (not shown in the figure), configured to acquire a diffuse map, a normal map and a mask map of each model component in each group of model components; and a first processing sub-element (not shown in the figure), configured to merge the diffuse maps of all the model components to obtain at least one diffuse merged map, merge the normal maps of all the model components to obtain at least one normal merged map, and merge the mask maps of all the model components to obtain at least one mask merged map.

Optionally, the second processing element (not shown in the figure) includes: a second processing sub-element (not shown in the figure), configured to acquire a diffuse map of each model component in each group of model components, and merge the diffuse maps of all the model components to obtain at least one diffuse merged map; a searching sub-element (not shown in the figure), configured to search for a UV region of the diffuse map of each model component in the current group in the at least one diffuse merged map; a creation sub-element (not shown in the figure), configured to create a normal merged map and a mask merged map corresponding to each diffuse merged map when the diffuse map, the normal map and the mask map of each model component share the same UV texture coordinates; and a third processing sub-element (not shown in the figure), configured to scale the normal map of each model component in the current group, copying the scaled normal map to a position corresponding to the UV region in the normal merged map, scale the mask map of each model component in the current group, and copy the scaled mask map to a position corresponding to the UV region in the mask merged map.

Optionally, the processing component 20 includes: a second acquisition element (not shown in the figure), configured to acquire map configuration information of a merged map where a map corresponding to a current model component contained in each game scene is located; a determination element (not shown in the figure), configured to determine, according to the map configuration information, whether the merged map where the map corresponding to the current model component is located has been loaded to a memory and buffered in the memory, when a determination result is yes, continue to perform a refreshing element, and when a determination result is no, proceed to a fourth processing element; the refreshing element (not shown in the figure), configured to refresh UV coordinates of each vertex on the current model component by using a UV matrix of the map corresponding to the current model component, and return to the second acquisition element until all model components contained in each of the at least one game scene are processed completely; and the fourth processing element (not shown in the figure), configured to create an initial merged map in the memory according to a preset map format, create a first hierarchically refined texture mapping chain matching the initial merged map, convert the initial merged map into the merged map where the map corresponding to the current model component is located according to a map layout manner of the memory, a map format adopted by the map corresponding to the current model component and a thumbnail of the merged map where the map corresponding to the current model component is located, and continue the refreshing step, and a size of the initial merged map is equal to a size of the merged map where the map corresponding to the current model component is located.

Optionally, the fourth processing element (not shown in the figure) includes: a loading sub-element (not shown in the figure), configured to load the map corresponding to the current model component and the thumbnail of the merged map where the map corresponding to the current model component is located in the memory; a fourth processing sub-element (not shown in the figure), configured to copy the map corresponding to the current model component to a corresponding UV region in the merged map where the map corresponding to the current model component is located according to the map layout manner of the memory; and a fifth processing sub-element (not shown in the figure), configured to stepwise copy a second hierarchically refined texture mapping chain matching the map corresponding to the current model component according to the map format adopted by the map corresponding to the current model component into a corresponding hierarchy of the first hierarchically refined texture mapping chain, and stepwise copy a third hierarchically refined texture mapping chain matching the thumbnail of the merged map into remaining hierarchies of the first hierarchically refined texture mapping chain.

It is to be noted that each of the above components may be implemented by software or hardware. The latter may be implemented by, but not limited to, the following manners: the above components are all located in the same processor; or, the above components are located in different processors respectively in any combined form.

Another embodiment of the present disclosure also provides a storage medium. The storage medium stores a computer program, and the computer program is configured to perform the steps in any one of the above method embodiments during running.

Optionally, in the present embodiment, the storage medium may be configured to store the computer program for performing the following steps.

At S1, a configuration file and a thumbnail are acquired in an off-line state, and the configuration file is used for storing map configuration information obtained by grouping and merging maps corresponding to model components contained in each of at least one game scene to be processed, and the thumbnail is a thumbnail display carrier of a merged map obtained by grouping and merging the maps corresponding to the model components contained in each game scene.

At S2, the maps corresponding to the model components contained in each game scene are loaded during game run, and the maps corresponding to the model components contained in each game scene and the thumbnail are merged according to the configuration file to obtain a merged map corresponding to the at least one game scene.

Optionally, in the present embodiment, the storage medium may include, but is not limited to, various media capable of storing a computer program such as a U disk, a Read-Only Memory (ROM), a Random Access Memory (RAM), a mobile hard disk, a magnetic disk or an optical disc.

Another embodiment of the present disclosure also provides a processor. The processor is configured to run a computer program to perform the steps in any one of the above method embodiments.

Optionally, in the present embodiment, the processor may be configured to perform the following steps through the computer program.

At S1, a configuration file and a thumbnail are acquired in an off-line state, and the configuration file is used for storing map configuration information obtained by grouping and merging maps corresponding to model components contained in each of at least one game scene to be processed, and the thumbnail is a thumbnail display carrier of a merged map obtained by grouping and merging the maps corresponding to the model components contained in each game scene.

At S2, the maps corresponding to the model components contained in each game scene are loaded during game run, and the maps corresponding to the model components contained in each game scene and the thumbnail are merged according to the configuration file to obtain a merged map corresponding to the at least one game scene.

Optionally, a specific example in the present embodiment may refer to the examples described in the above embodiments and optional implementation manners, and details are not described herein in the present embodiment.

The above serial numbers of the embodiments of the present disclosure are for the description, and do not represent the advantages and disadvantages of the embodiments.

In the above embodiments of the present disclosure, descriptions of each embodiment are emphasized respectively, and parts which are not elaborated in detail in a certain embodiment may refer to relevant descriptions of other embodiments.

In several embodiments provided by the present application, it is to be understood that the disclosed technical content may be implemented in other manners. The device embodiments described above are merely illustrative. For example, the division of the element may be a logical function division. In actual implementation, there may be another division manner, for example, multiple elements or components may be combined or integrated into another system, or some features may be ignored or not executed. In addition, the coupling or direct coupling or communication connection shown or discussed may be an indirect coupling or communication connection through some interfaces, elements or components, and may be electrical or otherwise.

The elements described as separate components may or may not be physically separated, and the members displayed as elements may or may not be physical elements, that is, may be located in one place, or may be distributed to multiple elements. Some or all of the elements may be selected according to actual needs to achieve the purpose of the solution of the present embodiment.

In addition, each functional element in each embodiment of the present disclosure may be integrated into a processing element, each element may also physically exist independently, and two or more than two elements may also be integrated into an element. The integrated element may be implemented in a hardware form and may also be implemented in form of software functional element.

The integrated element may be stored in a computer-readable storage medium if being implemented in the form of a software functional element and sold or used as a standalone product. Based on such understanding, the technical solution of the present disclosure, which is essential or contributes to the conventional art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure. The foregoing storage medium includes: a U disk, a ROM, a RAM, a mobile hard disk, a magnetic disk, or an optical disk, and the like, which may store a program code.

The above are exemplary implementations of the present disclosure. It is to be noted that a number of modifications and refinements may be made by those of ordinary skill in the art without departing from the principles of the present disclosure, and such modifications and refinements are also considered to be within the scope of protection of the present disclosure.

What is claimed is:

1. A method for acquiring a merged map, comprising:
   acquiring a configuration file and a thumbnail in an off-line state, wherein the configuration file is used for storing map configuration information obtained by grouping and merging maps corresponding to model components contained in each of at least one game scene to be processed, and the thumbnail is a thumbnail display carrier of a first merged map, and the first merged map is obtained by grouping and merging the maps; and
   loading the maps during game run, and merging the maps and the thumbnail according to the configuration file to obtain a second merged map.

2. The method as claimed in claim 1, wherein acquiring the configuration file in the off-line state comprises:
   acquiring model components contained in each game scene;
   grouping the model components contained in each game scene according to texture information of each model component to obtain a model component grouping result;
   merging maps corresponding to each group of model components respectively according to the model component grouping result to obtain a third merged map; and
   acquiring map configuration information of the third merged map, and storing the map configuration information to the configuration file, wherein the map configuration information at least comprises: a storage path of the third merged map, a size of the third merged map, and a storage path and a UV matrix of a map corresponding to each model component contained in the third merged map.

3. The method as claimed in claim 2, wherein acquiring the model components contained in each game scene comprises:
   acquiring the at least one game scene by scanning a preset resource catalog; and
   parsing a scene file of each of the at least one game scene to acquire the model components contained in each game scene.

4. The method as claimed in claim 2, wherein grouping the model components contained in each game scene according to the texture information of each model component to obtain the model component grouping result comprises:
   acquiring a diffuse map, a normal map and a mask map of each model component, wherein the diffuse map is used for describing diffuse color information of each model component, the normal map is used for describing normal information of each model component, and the mask map is used for describing texture information of each model component; and
   classifying part of the model components not containing transparent channels in the diffuse maps into a first group of model components, classifying part of the model components that contain transparent channels in the diffuse maps and are determined to be self-luminous according to mask maps into a second group of model components, and classifying part of the model components that contain transparent channels in the diffuse maps and are determined to be not self-luminous according to the mask maps into a third group of model components, wherein each model component in the first group of model components is a non-transparent model component, each model component in the second group of model components is a self-luminous model component, and each model component in the third group of model components is a semi-transparent model component.

5. The method as claimed in claim 4, wherein merging the maps according to the model component grouping result to obtain the third merged map comprises:
   acquiring the diffuse map, the normal map and the mask map; and
   merging the diffuse maps of all the model components to obtain at least one diffuse merged map, merging the normal maps of all the model components to obtain at least one normal merged map, and merging the mask maps of all the model components to obtain at least one mask merged map.

6. The method as claimed in claim 4, wherein merging the maps according to the model component grouping result to obtain the third merged map comprises:
   acquiring the diffuse map of each model component in each group of model components, and merging the diffuse maps of all the model components to obtain at least one diffuse merged map;
   searching for a UV region of the diffuse map of each model component in a current group in the at least one diffuse merged map;
   creating a normal merged map and a mask merged map corresponding to each diffuse merged map when the diffuse map, the normal map and the mask map of each model component share the same UV texture coordinates; and scaling the normal map of each model component in the current group, copying the scaled normal map to a position corresponding to the UV region in the normal merged map, scaling the mask map of each model component in the current group, and copying the scaled mask map to a position corresponding to the UV region in the mask merged map.

7. The method as claimed in claim 1, wherein merging the maps and the thumbnail according to the configuration file to obtain the second merged map comprises:
  at an acquisition step, acquiring map configuration information of a fourth merged map where a map corresponding to a current model component contained in each game scene is located;
  at a determination step, determining, according to the map configuration information, whether the fourth merged map has been loaded to a memory and buffered in the memory, when a determination result is yes, continuing to perform a refreshing step, and when the determination result is no, proceeding to a processing step;
  at the refreshing step, refreshing UV coordinates of each vertex on the current model component by using a UV matrix of the map corresponding to the current model component, and returning to the acquisition step until all model components contained in each of the at least one game scene are processed completely; and
  at the processing step, creating an initial merged map in the memory according to a preset map format, creating a first hierarchically refined texture mapping chain matching the initial merged map, converting the initial merged map into the fourth merged map according to a map layout manner of the memory, a map format adopted by the map corresponding to the current model component and a thumbnail of the fourth merged map, and continuing the refreshing step, wherein a size of the initial merged map is equal to a size of the fourth merged map.

8. The method as claimed in claim 7, wherein converting the initial merged map into the fourth merged map according to the map layout manner of the memory, the map format adopted by the map corresponding to the current model component and the thumbnail of the fourth merged map comprises:
  loading the map corresponding to the current model component and the thumbnail of the fourth merged map;
  copying the map corresponding to the current model component to a corresponding UV region in the fourth merged map according to the map layout manner of the memory; and
  stepwise copying a second hierarchically refined texture mapping chain matching the map corresponding to the current model component according to the map format adopted by the map corresponding to the current model component into a corresponding hierarchy of the first hierarchically refined texture mapping chain, and stepwise copying a third hierarchically refined texture mapping chain matching the thumbnail of the fourth merged map into remaining hierarchies of the first hierarchically refined texture mapping chain.

9. The method as claimed in claim 1, wherein the at least one game scene is a single specified game scene, or is a list of a plurality of scenes to be processed input through a list form.

10. A non-transitory storage medium, comprising a stored program, wherein when the stored program is run, a device where the storage medium is located is controlled to perform the following steps:
  acquiring a configuration file and a thumbnail in an off-line state, wherein the configuration file is used for storing map configuration information obtained by grouping and merging maps corresponding to model components contained in each of at least one game scene to be processed, and the thumbnail is a thumbnail display carrier of a first merged map, and the first merged map is obtained by grouping and merging the maps; and
  loading the maps during game run, and merging the maps and the thumbnail according to the configuration file to obtain a second merged map.

11. A terminal, comprising: at least one processor, a memory, a display device, and at least one program, wherein the at least one program is stored in the memory, and configured to be run by the at least one processor, the at least one program being configured to perform following steps:
  acquiring a configuration file and a thumbnail in an off-line state, wherein the configuration file is used for storing map configuration information obtained by grouping and merging maps corresponding to model components contained in each of at least one game scene to be processed, and the thumbnail is a thumbnail display carrier of a first merged map, and the first merged map is obtained by grouping and merging the maps; and
  loading the maps during game run, and merging the maps and the thumbnail according to the configuration file to obtain a second merged map.

\* \* \* \* \*